INVENTOR.
ARTHUR R. CANADY

United States Patent Office 3,609,840
Patented Oct. 5, 1971

3,609,840
PROCESS FOR FRICTIONALLY WELDING AN
INTERNALLY COOLED PISTON
Arthur R. Canady, Washington, Ill., assignor to
Caterpillar Tractor Co., Peoria, Ill.
Original application Oct. 9, 1967, Ser. No. 673,824, now
Patent No. 3,485,143, dated Dec. 23, 1969. Divided
and this application June 12, 1969, Ser. No. 871,127
Int. Cl. B23p 15/10
U.S. Cl. 29—156.5 R     4 Claims

ABSTRACT OF THE DISCLOSURE

A process for sealing a piston cavity having a combustible coolant therein by frictionally welding two component portions of a piston together thereby avoiding any possibility of igniting the coolant.

This application is a division of Ser. No. 673,824 filed Oct. 9, 1967, and now Pat. No. 3,485,143.

BACKGROUND OF THE INVENTION

This invention relates to improvements in friction bonding of the general type wherein two workpieces are subjected to relative rotation while in rubbing contact with each other to generate frictional heat to raise the workpieces to a suitable welding temperature whereupon the relative rotation subsides and the workpieces become welded or bonded together.

It is also to be understood that the invention is specifically applicable to the inertia welding process. In the inertia welding process the energy required to bring the common interface of the parts to a bondable condition is stored as kinetic energy in rotating inertia weights. These weights generally take the form of flywheels and are connected to one of the parts and the entire energy necessary to form the bond is stored in the weights prior to engagement of the parts at the interface. The stored energy is discharged into the interface through frictional heating and plastic working developed at the interface as the rubbing contact slows the rotating weights and the bonding cycle is concluded.

This application is particularly directed to an internally cooled piston wherein the coolant containing cavity of the piston is sealed by friction welding.

Certain piston-type internal combustion engines are subjected to extremely high operating temperatures, and a relatively large amount of heat is absorbed by the piston head. This heat cannot pass away from the piston head rapidly enough to prevent substantially higher temperatures from arising at the crown portion of the piston head than at other portions thereof. These differences in temperature cause heat stresses which tend to form cracks, etc., and thereby damage the piston.

In order to quickly dissipate the high heat generated at the crown portion of the piston head an efficient heat transfer agent may be placed in an internal cavity formed in the head portion of the piston to serve as a heat exchanger. Very often, these cooling agents take the form of a fluid metal such as mercury or sodium or a sodium-mercury mixture or a metallic salt.

While many of these substances serve as efficient heat transfer agents for internally cooled pistons, they are also often dangerous to work with since many of these substances are highly reactive and, among other things, will ignite easily and in the presence of a very small amount of moisture.

It is, therefore, the principal object of the present invention to provide a safe, fast and effective operation for closing and sealing the cavity of an internally cooled piston which contains a highly reactive cooling agent.

Other objects and advantages of the present invention will be apparent from the following description and claims and are illustrated in the accompanying drawings which, by way of illustration, show preferred embodiments of the present invention and the principles thereof and what are now considered to be the best mode contemplated for applying these principles. Other embodiments of the invention embodying the same or equivalent principles may be used and structural changes may be made as desired by those skilled in the art without departing from the present invention and the purview of the appended claims.

DESCRIPTION OF THE PREFERRED EMBODIMENTS

Figure 1:
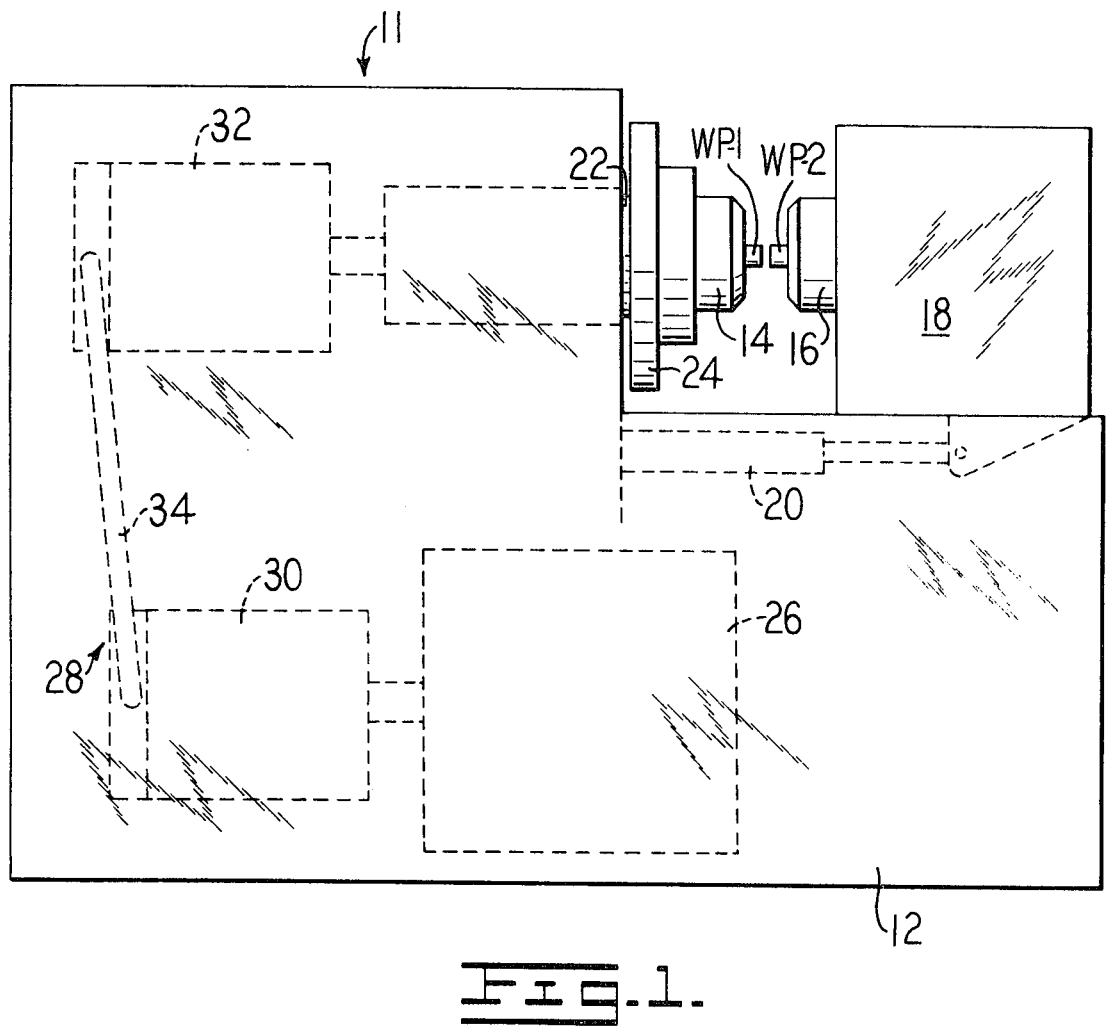
FIG. 1 is a side elevation illustrating one embodiment of a friction welding machine which may be used to practice the present invention.

FIG. 1 illustrates a friction welding machine which may be used to practice the present invention. The machine which is indicated generally by reference numeral 11 is shown oriented in a horizontal plane, however, it is to be understood that the machine may be turned about its longitudinal axis so as to operate in the vertical plane. As shown, the machine comprises a frame or housing structure generally denoted at 12 for housing the various elements of the machine. Two exemplary parts to be welded, workpieces WP–1 and WP–2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit, not shown, regulates the pressure in the load cylinder, and thus determines the force with which the parts WP–1 and WP–2 are engaged.

The chuck 14 is mounted on a spindle 22 and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission indicated generally by the reference numeral 28. The hydrostatic transmission includes a hydraulic pump 30 and a hydraulic motor 32 and a manifold 34 between the pump and motor.

The drive ratio between the motor and the spindle 22 can be varied by changing the cam angles in either the pump 30 or the motor 32 and the pump and motor can be used to effectively disconnect the motor from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertia welding machine as described in U.S. Pat. No. 3,273,233 and as described in further detail below.

A welding operation to join a first workpiece to a second workpiece can be performed by operating the machine in the following general manner. One of the workpieces WP-1 is firmly clamped in the rotatable chuck 14 located on the spindle 22. The other weldpiece WP-2 is firmly clamped in the nonrotatable chuck 16 which is located on the tailstock portion 18 of the machine. Upon actuation of the motor 26 the flywheel and workpiece WP-1 are accelerated to a predetermined velocity.

Once the predetermined velocity has been attained, the motor 26 is disconnected or shutdown and the ram mechanism 20 is actuated to move tailstock portion 18 and workpiece WP-2 into contact with the rapidly rotating workpiece WP-1. As the two workpieces are brought into contact under the upsetting pressure supplied through ram 20, heat is generated at the contacting surfaces or interface of the workpieces. This heating increases until the workpieces reach the weld temperature at which time the upsetting pressure, applied by the ram 20 at either a constant or varying pressure, causes flashing or upsetting to occur. During this heating and flashing the rotational velocity of the spindle member 22 has continued to decrease. At the time the rotation of the spindle ceases, upsetting has taken place and the weld is completed.

Figure 2:
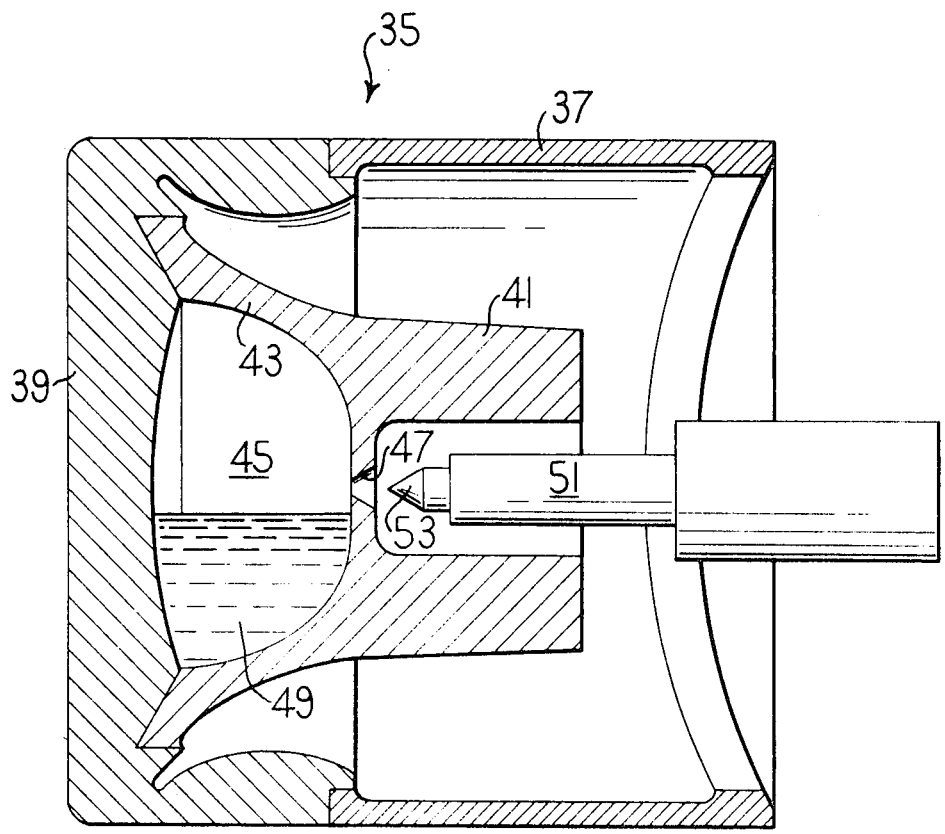
FIG. 2 is a cross-sectional view of a preferred embodiment of an internally cooled piston constructed in accordance with the invention.

FIG. 2 illustrates one preferred embodiment of an internally cooled piston which is constructed in accordance with the present invention. The piston 35 is comprised of three main elements: an annular skirt 37, a crown portion 39, and a rod strut 41. As shown in FIG. 2 the crown portion 39 is joined to and closes one end of the annular skirt 37 and the rod strut 41 is joined to the crown portion 39 and depends therefrom internally of the annular skirt 37. In the particular embodiment shown, the skirt 37, crown 39 and rod strut 41 are joined to each other by furnace brazing.

The strut 41 is formed with a hollow bowl-like portion 43 which cooperates with the crown member 39 to define a cavity 45. A filler hole 47 is machined into the strut 41 for the admission of a coolant substance, such as the sodium-mercury mixture shown at 49. The filler hole 47 is preferably machined on a taper as shown to provide more surface area for welding and to insure positive alignment of the hole 47 with a weld rod 51 which is friction welded into the hole 47 to positively seal and plug the hole in a manner which will be subsequently described. Positive alignment is made possible by machining an identical taper 53 on the end of the weld rod 51. The weld rod 51 may be made of stainless steel to provide needed strength for the area closing the hole 47.

Sealing of the filler hole 47 by friction welding takes place in the following manner. The piston assembly 35 having the pre-machined filler hole 47 is firmly clamped in the chuck 16 which is attached to the tailstock portion of the friction welding machine shown in FIG. 1. The weld rod 51 is then clamped in the rotatable chuck 14 of the welding machine. The cooling agent 49 (sodium-mercury mixture) is then inserted into the cavity 45 of the piston 35. The rotatable portion of the friction welding machine including spindle 22, flywheel 24, chuck 14, and the weld rod 51 clamped thereto is then accelerated to a predetermined velocity.

After the predetermined velocity has been attained, a predetermined axial pressure is applied via the ram assembly 20 for bringing the piston assembly 35 into contact with the rapidly rotating weld rod 51. Frictional heat generated by the relative motion between the piston and the weld rod raises the contacting interface beween the two workpieces 35 and 51 to the welding temperature at which time upsetting and flashing takes place. The rotational velocity of the machine has continued to decrease during the heating and flashing and the machine comes to rest as the weld is completed.

Since this type of weld is completed in a very short time (a weld time of 0.2 second is not uncommon), only a small area of the piston is heated and there is minimal danger of igniting the sodium-mercury mixture inside the cavity 45. After the completed piston assembly is removed from the welding machine 11, the excess weld rod material may be machined away from the piston leaving a positively sealed and flush surface.

Typical welding parameters for welding a weld rod such as shown at 51 into a filter hole such as shown at 47 are as follows: surface velocity—600 to 1000 feet per minute; axial pressure—approximately 13,000 pounds per square inch; input energy—approximately 23,000 foot-pounds per square inch.

Figure 3:
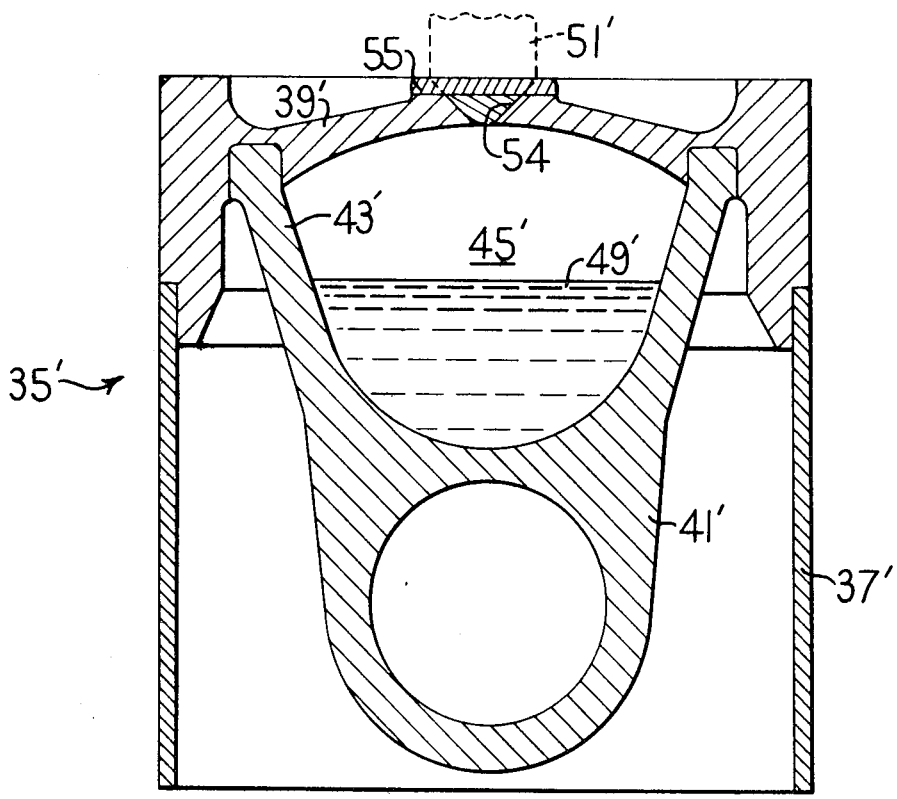
FIG. 3 is a cross-sectional view of a modified embodiment of an internally cooled piston constructed in accordance with the present invention; and, FIG. 4 is a cross-sectional view illustrating yet another embodiment of an internally cooled piston constructed in accordance with this invention.

FIG. 3 illustrates a modified embodiment of an internally cooled piston assembly very similar to that shown in FIG. 2. In FIG. 3, all structural elements which are the same as those shown in FIG. 2 are denoted by primed (′) reference characters. In FIG. 3, a filler hole 54 was machined in the crown portion 39′ of the piston. After the cooling agent 49′ was admitted to the cavity 45′, the filler hole 54 was plugged by friction welding a portion of the weld rod 51′ (shown in phantom outline) thereto in a manner substantially identical to that described with respect to FIG. 2. In the embodiment shown in FIG. 3, a heat resistant deposit 55 has been welded over the previously machined weld plug material 51′ to serve as a heat plug.

Figure 4:
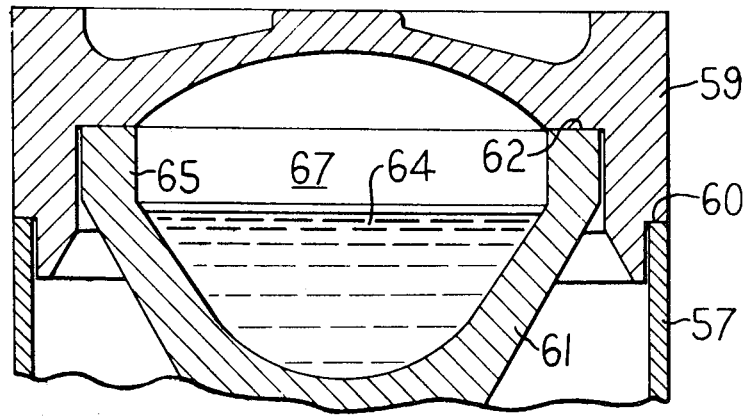

FIG. 4 illustrates yet another embodiment of an internally cooled piston assembly constructed in accordance with the present invention. In the embodiment shown in FIG. 4 the individual piston members such as the skirt, crown and strut are joined together by friction welding rather than brazing. In the construction shown, the skirt 57 is first friction welded to the crown 59 at the area denoted at 60. The strut member 61 may then be welded to the crown 59 in the area 62 by the following procedure.

A machine such as shown in FIG. 1 is oriented in a vertical plane and the strut member 61 is clamped in the nonrotating chuck 16. The cooling agent 64 is then placed inside the generally cup-shaped portion 65 of the strut member. The crown portion 59 of the piston having the skirt 57 already friction welded thereto is then clamped in the rotating chuck 14 of the friction welding machine. The rotating portion of the machine is then accelerated to a predetermined velocity at which time a predetermined axial pressure is applied bringing the crown portion 59 and strut member 61 into engagement at the area 62. Frictional heat generated by the relative motion between the interface defined by these two parts brings the interface to the welding temperature and the parts are bonded together thereby sealing the coolant inside the cavity 67.

It will be observed that in all of the embodiments disclosed, the cooling agent is positively sealed within the internal piston cavity without heating a large area of the piston. These structures thereby minimize the possibility of igniting or otherwise disturbing the highly reactive cooling agent contained within the internal piston cavity.

I claim:

1. A method of making an internally cooled piston comprising forming a head member of said piston to define a cavity, supplying a quantity of combustible coolant to said cavity, placing a sealing member in contact with said head member so as to close said cavity, said sealing member and head member being arranged so that said combustible coolant is spaced from the mutual contacting portions thereof, and friction welding said head member and sealing member together so as to seal said cavity in a fluid tight manner whereby said combustible coolant is not ignited and a rigid welding of the two members is accomplished.

2. A method as in claim 1 wherein said forming step includes forming a crown portion and a rod strut portion and joining them together to form said head member and said cavity, said rod strut portion being formed with a small aperture therein, said sealing member being a plug and said welding step comprising friction welding said plug into said aperture to seal said cavity.

3. A method as in claim 1 wherein said forming step includes forming a crown portion and a rod strut portion and joining them together to form said head member and cavity, said crown portion being formed with a small aperture therein, said sealing member being a plug and said welding step comprising friction welding said plug into said aperture to seal said cavity.

4. A method as in claim 1 wherein said head member comprises a crown portion of said piston and said sealing member comprises a rod strut portion of said piston, said portions being formed so as to define an enclosed cavity when friction welded together.

References Cited

UNITED STATES PATENTS

| | | | |
|---|---|---|---|
| 1,678,957 | 7/1928 | Philipp | 92—176X |
| 1,953,109 | 4/1934 | Heron | 92—176X |
| 2,537,174 | 1/1951 | Townhill | 92—176X |
| 3,144,710 | 8/1964 | Hollander et al. | 29—470.3 |
| 3,273,233 | 9/1966 | Oberle et al. | 228—2X |
| 3,516,335 | 6/1970 | Fangman | 92—176 |

JOHN F. CAMPBELL, Primary Examiner

V. A. Di PALMA, Assistant Examiner

U.S. Cl. X.R.

29—470.3; 228—2